(12) United States Patent
Dolan (10) Patent No.: US 7,043,080 B1
(45) Date of Patent: May 9, 2006

(54) METHODS AND SYSTEMS FOR TEXT DETECTION IN MIXED-CONTEXT DOCUMENTS USING LOCAL GEOMETRIC SIGNATURES

(75) Inventor: John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 506 days.

(21) Appl. No.: 09/718,528

(22) Filed: Nov. 21, 2000

(51) Int. Cl.
*G06K 9/48* (2006.01)

(52) U.S. Cl. ............... 382/199; 382/173; 382/176; 382/205; 382/260; 358/3.13; 358/462

(58) Field of Classification Search ............... 382/190, 382/195, 199, 200, 205, 260–266, 176, 173; 358/1.9, 3.13, 462
See application file for complete search history.

(56) References Cited

U.S. PATENT DOCUMENTS

| 4,504,972 | A | | 3/1985 | Scherl et al. ............... 382/171 |
|---|---|---|---|---|
| 5,001,576 | A | | 3/1991 | Tanaka et al. ............... 358/462 |
| 5,081,689 | A | | 1/1992 | Meyer et al. ............... 382/199 |
| 5,202,928 | A | * | 4/1993 | Tomita et al. ............... 382/154 |
| 5,245,674 | A | * | 9/1993 | Cass et al. ............... 382/200 |
| 5,253,307 | A | * | 10/1993 | Wayner et al. ............... 382/181 |
| 5,392,365 | A | | 2/1995 | Steinkrichner ............... 382/260 |
| 5,583,659 | A | * | 12/1996 | Lee et al. ............... 358/3.13 |
| 5,583,949 | A | * | 12/1996 | Smith et al. ............... 382/199 |
| 5,745,596 | A | | 4/1998 | Jefferson ............... 382/176 |
| 5,946,420 | A | | 8/1999 | Noh ............... 382/254 |
| 6,160,913 | A | * | 12/2000 | Lee et al. ............... 382/176 |
| 6,227,725 | B1 | * | 5/2001 | Ancin et al. ............... 358/1.9 |
| 6,408,109 | B1 | * | 6/2002 | Silver et al. ............... 382/300 |
| 6,415,053 | B1 | * | 7/2002 | Norimatsu ............... 382/199 |

FOREIGN PATENT DOCUMENTS

| JP | 2001-052186 | 2/2001 |
|---|---|---|
| JP | 02-150979 | 5/2002 |

* cited by examiner

*Primary Examiner*—Kanjibhai Patel
*Assistant Examiner*—Manav Seth
(74) *Attorney, Agent, or Firm*—Krieger Intellectual Property, Inc.; Scott C. Krieger (57) ABSTRACT

Embodiments of the present invention relate to methods and systems for detection and delineation of text characters in images which may contain combinations of text and graphical content. Embodiments of the present invention employ intensity contrast edge detection methods and intensity gradient direction determination methods in conjunction with analyses of intensity curve geometry to determine the presence of text and verify text edge identification. These methods may be used to identify text in mixed-content images, to determine text character edges and to achieve other image processing purposes.

7 Claims, 5 Drawing Sheets

Figure 8

METHODS AND SYSTEMS FOR TEXT DETECTION IN MIXED-CONTEXT DOCUMENTS USING LOCAL GEOMETRIC SIGNATURES

THE FIELD OF THE INVENTION

Embodiments of the present invention relate to methods and systems for detection and delineation of text characters in images containing combinations of text and graphical content. More particularly, these methods and systems detect text by computing local evidence of character strokes without the resource-consuming global and regional analyses of existing techniques or the limitations of directional scan-line techniques.

BACKGROUND

Various components of images may be processed in order to optimize or otherwise modify the visual aspects of the image. Digital photographs may be processed in several ways to enhance the visual qualities of the image and add special effects or other modifications. Images containing text may also be enhanced by methods which increase legibility, character contrast, sharpness or other visual characteristics. While both textual and graphical images may be processed and enhanced, the methods for processing text and graphical images are not the same.

Graphical images such as digital photographs and scanned graphics may be processed using techniques that remove noise, adjust color and contrast, reduce aliasing and create special effects. These techniques adjust characteristics of the graphic while maintaining the integrity of the image. Because these images typically involve many colors, shades and contrast levels, the techniques used generally vary significantly from those used for textual processing.

Text may be processed to enhance legibility or modify its visual characteristics or to convert between formats. Visual modification may involve contrast adjustment, character sharpness and other visual characteristics. Text images may also be converted from an image file format to a text file format using character recognition methods such as raster-to-text methods. Furthermore, the compression algorithms used for text may differ from those used for photographs and other graphics. Higher compression ratios are available for text than for graphical elements and overall image compression may be improved when text elements are separated out and compressed at higher ratios.

Because text and graphical elements are processed very differently, an image which contains both text and graphical elements must be partitioned into segments for optimal processing of both elements. In order to make this partition, text-containing areas must be identified and distinguished from graphical areas which require different processing techniques.

Various methods have been used to identify text elements. Some of these methods employ scan-line techniques in which rows or columns of pixels are evaluated to determine intensity or luminance levels. Consecutive intensity levels are compared to whether the intensity has changed significantly from one pixel to the next. When significant intensity changes occur, the location is marked as an edge. Changes from light to dark and dark to light may be distinguished as rising or falling intensity levels and may be identified accordingly, for example, by opposite signs. As text characters typically involve high contrast edges of opposite sign within close proximity, this condition may be used to identify the presence of text in a document. Processing of single scan-line data can produce false-positive text in high-contrast graphical image areas. These methods may also produce false-negative results in areas with bold or large text. More particularly, false-negative results may arise when a scan-line crosses the top of a character such as a "T" which has a broad area between successive opposing edges.

Other methods involve the use of segmentation into successive windows in which a series of histograms are computed. In some methods, the image may be thresholded to black and white and length of run histograms may be generated for runs of black and white pixels. The frequency of runs of a specific length may be used to determine whether text or graphical content is present.

Another known method of distinguishing between textual and graphical areas involves image smoothing followed by comparison of each pixel with a threshold density. Each pixel is classified as textual or graphical. The length or area of each region is then compared to a reference length or area. Regions with values below the reference are designated as text.

Other known methods are used to find the edges of characters for text enhancement techniques and other modifications. One scan-line-based method locates oppositely signed pairs of curvature extrema along the scan-line. Curvature is estimated by computing local angular differences in the slope of the image function along a scan-line followed by computing the local changes in angle along the scan-line. Pairs of significant curvature-extrema are taken as edge boundaries. Edge points are computed as the intervening pixel closest in value to the average intensity. Edge points are then linked across neighboring scan-lines to form straight line segments.

Another method of text edge-detection performs edge detection at two scales on binarized image data. Gray-scale or intensity data may be thresholded prior to smoothing and edge filtering. Halftone dot detection using pattern matching is performed on the binary image data. Detection of solid areas near dotted areas is also performed via pattern matching. The detected dotted and solid areas are considered regions of halftone and are subtracted from the original edge data leaving edges classified as text only.

Known methods and apparatus suffer from false detection determinations, burdensome processing requirements and the necessity of evaluating complete images or large portions thereof.

SUMMARY AND OBJECTS OF THE INVENTION

Embodiments of the present invention provide improved methods and systems for detecting and delineating text in scanned or otherwise digitized images with mixed-content. These systems and methods are particularly useful for digital copying, compression and optical character recognition applications especially those involving mixed-content color documents where speed and image quality are paramount.

In some embodiments of the present invention, text detection and localization is computed on the grayscale or intensity information of an image or portion thereof. These methods may be used for processing of color images when the grayscale or other intensity information inherent in the color image is utilized. This grayscale or intensity information may be represented as a three-dimensional diagram, map or two-dimensional functional surface.

Because characters are based on curvilinear segments originally derived from pen or brush strokes, these curvilinear segments typically appear as valley or ridge structures on the intensity map. Each character segment, either curved, linear or some curvilinear combination may be referred to as a "stroke." Text may be detected by the presence of strokes rather than complete characters or groups of characters thereby reducing detection time and resources.

Using the methods of embodiments of the present invention, strokes may be detected in small, localized areas or over larger areas. Edges which exist between high-contrast areas are detected and identified. This may be achieved using a variety of edge detection techniques known in the art. First derivative techniques such as, but not limited to, Sobel edge detection are preferred as they provide intensity gradient information. Using these techniques, high-contrast edges and vector data identifying the direction of the local maximum intensity gradient may be identified.

Methods of embodiments of the present invention may also comprise techniques for identifying valleys and ridges of character strokes. Character strokes may be plotted on a three-dimensional map having pixels mapped with their intensity plotted as a third dimension perpendicular to a plane designating location coordinates. In this manner, the terrain of the map rises and falls with varying intensity. The cross-section of a character stroke displayed in this way shows a prominent rising or falling slope at the leading edge of a character and a corresponding inverse slope at the trailing edge. The region between these cross-sectional slopes or edges typically forms one or more ridges or valleys which correspond roughly to an axis of the character stroke. These ridges and valleys may be identified so that their relationship to character edges or other image attributes may be examined. These ridge and valley determination processes may be performed simultaneous to edge detection processes or at some other time either before or after edge detection.

In a preferred embodiment, ridges and valleys are detected by progressively analyzing the intensity differential of adjacent pixels. Each successive pixel is analyzed to determine whether the curvature of the intensity reaches a maximum absolute value at the same point that the curvature of the intensity map in another direction, such as a roughly perpendicular direction, is close to zero. In this document, the term "transverse" is used to describe a direction which is substantially or roughly perpendicular to the longitudinal axis of a shape or object. Because the intensity gradient defines a direction transverse to the character stroke, this condition typically indicates that the shape of the character stroke has "peaked" in a valley or ridge while the character stroke intensity is relatively constant in the longitudinal direction of the stroke. Smoothing processes may be used on the image before ridge or valley detection procedures to tailor specific detection results.

Once edges and ridges and/or valleys have been identified, the methods of some embodiments of the present invention calculate spatial relationships between edges and adjacent ridges and/or valleys. The proximity of an edge to an adjacent ridge or valley may be determinative of the presence of text characters in the image. Typically, an image with edges in close proximity to valleys or ridges is a strong indication of the presence of text in the image.

Because the width or thickness of text characters often vary widely when measured in a single direction (i.e., the horizontal width of the top of a "T" relative to the bottom), errors are introduced when these wider character components are identified as graphical components. These errors are inherent in unidirectional techniques such as scan-line methods. The methods and systems of embodiments of the present invention are capable of measuring the distance between an edge and an adjacent valley or ridge in the direction of the intensity gradient. In this manner, dimensions are measured perpendicular to a character's stroke axis across its shortest dimension. This can be achieved for characters with strokes of any curvilinear shape.

In preferred embodiments, the distance between a pixel identified as an edge and an adjacent valley or ridge is measured in the direction of the intensity gradient when measuring to a ridge and in a direction opposite to the intensity gradient when measuring to a valley. In this manner, the distance between an edge and an adjacent valley or ridge is measured in a direction roughly perpendicular to the character stroke axis when a character is present.

When a valley or ridge is found within a specified proximity to an edge, the pixel, group of pixels or some other associated region or neighborhood may be designated as being related to text. In some embodiments, each edge pixel is analyzed to determine its proximity to a valley or ridge. When the proximity is within specified parameters, the pixel is labeled as a text edge. This process is repeated for each pixel which has been identified as an edge.

When character contrast and sharpness enhancement methods are employed, this identification of character edges may be sufficient for identification of text edges for further treatment, however some embodiments of the present invention may further identify regions of text for segregation and selective processing. Some embodiments may identify regions of text for OCR processing, compression or other processing and treatment.

Accordingly, it is an object of some embodiments of the present invention to provide systems and methods for detecting text, line art and similar graphical structures in mixed-content documents.

It is another object of some embodiments of the present invention to provide systems and methods for detecting and verifying edges of text, line art and similar graphical structures in images.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 8 is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

Embodiments of the present invention may detect and delineate text in digital images. These images are generally represented by image components or picture elements which may be referred to as pixels, pels or other nomenclature. Each pixel typically defines a location and one or more visual characteristics of an image at that location. Naturally, color images with a wide spectrum of colors and monochrome images with a wide variety of grayscale variations can contain a large amount of data in addition to pixel location data. Many digital image encoding formats or color spaces exist including RGB, HSV, Lab, YIQ, and many others. While these formats include color information and other data, they are generally easily converted to a grayscale format comprising two-dimensional coordinates and a luminance or intensity value. While color attributes may be lost in the converted format, the contrast between adjacent pixels is generally well preserved. Because conventional text is typically displayed in high-contrast situations, it is well preserved when converted to a simple grayscale image format.

Grayscale images may be visualized as a three-dimensional map or plot with the X, Y location coordinates defining a horizontal plane and the intensity value being plotted in the Z direction perpendicular to that plane. These intensity maps may be used to visualize image characteristics and to analyze the image based on geometric relationships on the map. Geometric analysis and techniques of differential geometry may be used to establish relationships between pixels or groups thereof.

Figure 1A:
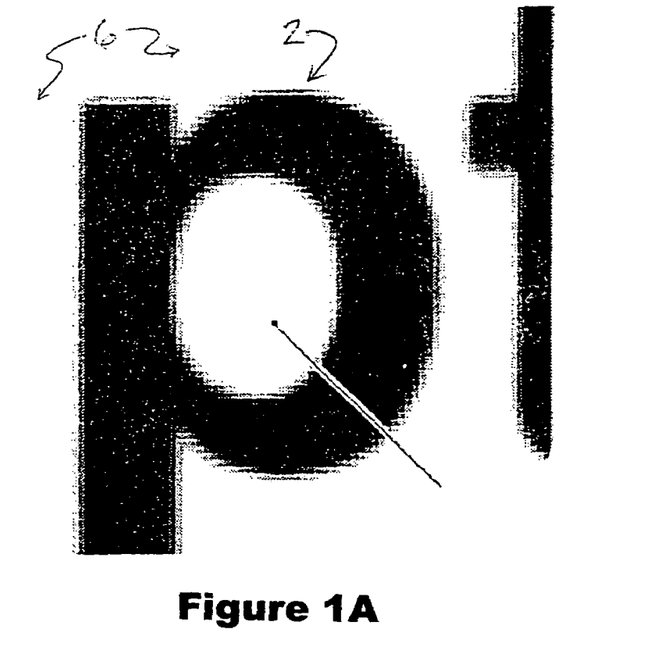
FIG. 1A shows an image with dark text characters on a light background.
Figure 1B:
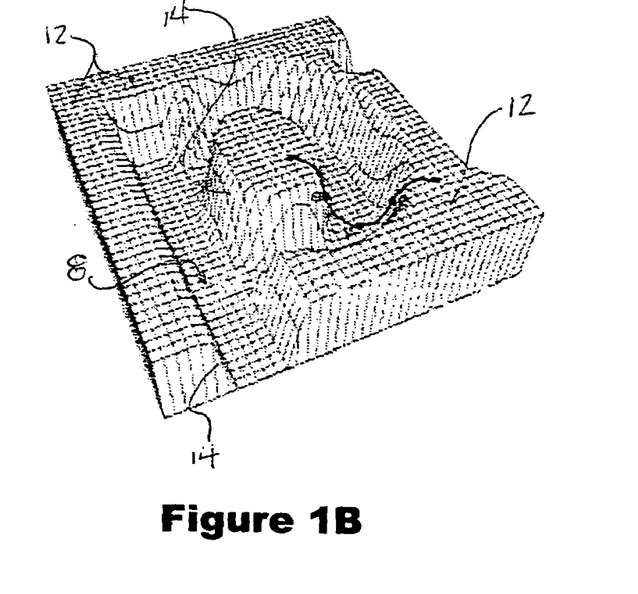
FIG. 1B depicts an image intensity map of the image in FIG. 1A.
Figure 2A:
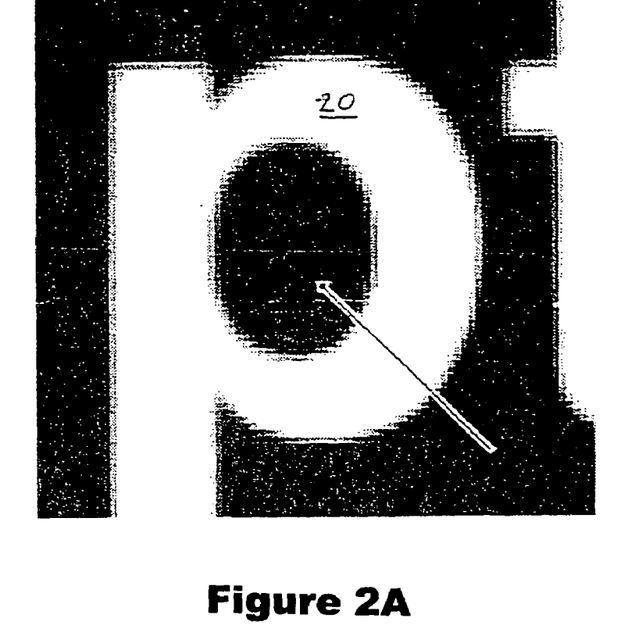
FIG. 2A shows an image with light text characters on a dark background.
Figure 2B:
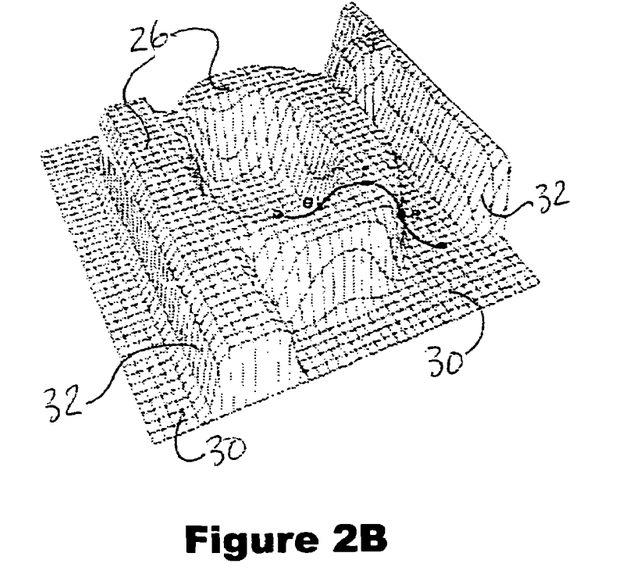
FIG. 2B depicts an image intensity map of the image in FIG. 2A.

As text characters are typically displayed as symbols with a high-contrast background, they generally show up as significant rises or drops in the "terrain" of an intensity map as may be seen in FIGS. 1B and 2B. FIG. 1A shows a typical text character "p" 2 with dark text symbols on a light background 6. Accordingly, the corresponding intensity map, as shown in FIG. 1B shows a dark character as a depression 8 and the light background as an elevated surface 12. The edges of the characters have a steep slope 14 representing the abrupt transition from light background to dark character.

In reference to FIG. 2A, a light character "p" 20 is shown against a dark background 24. The intensity map corresponding to FIG. 2A is shown as FIG. 2B where the light character "p" 20 is shown as elevated surface 26. Dark background 24 is shown as depressed surface 30. The edges of these characters also have a steep slope 32 representing the abrupt transition from dark background to light character.

The variation in intensity between adjacent pixels along these edge slopes 14, 32 is pronounced in relation to those within the character or background. This significant intensity differential is typically used to detect these high-contrast text edges in a digitized image. Many known techniques may be used for this process. These edge detection processes will typically identify an edge similar to that shown in FIG. 3 for the image shown in FIG. 1A. Edge pixels 42 along the high-contrast edge between character and background are identified.

Figure 3:
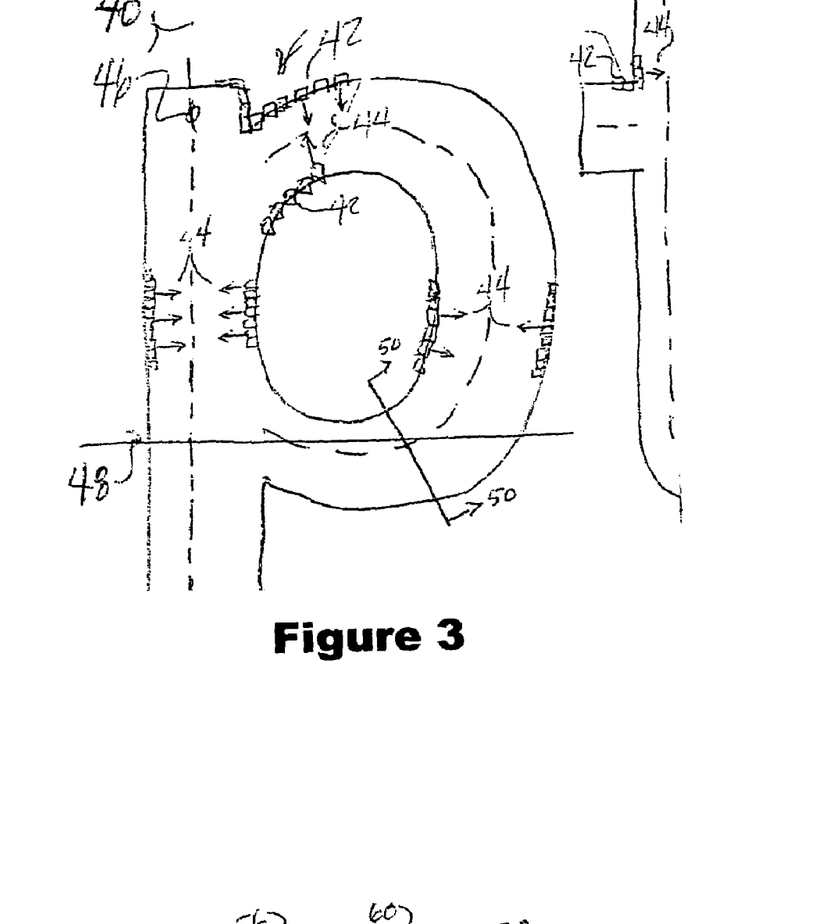
FIG. 3 shows the results of using a first derivative edge detection method to identify text edges and edge intensity gradient information.

In addition to the identification of edge pixels 42, some edge detection techniques or related techniques also identify intensity gradient information comprising a maximum intensity gradient direction 44 which points toward the direction of highest intensity change. This vector information can be used to increase method speed, efficiency and reliability as will be discussed below. Preferred embodiments of the present invention employ first derivative edge detection techniques, for example, but not limited to, Sobel techniques.

As well as edge detection, the methods and systems of embodiments of the present invention also comprise character stroke axis identification. Because characters are based on curvilinear segments originally derived from pen or brush strokes, these curvilinear segments have narrow, elongated signatures which typically appear as channels or berms on the luminance or intensity map with valleys or ridges along their axes. These character segments, either curved, linear or some curvilinear combination may be referred to as "strokes." The ridges or valleys of these strokes typically form substantially longitudinal axes along which the surface of the stroke reaches a maximum curvature in a transverse cross-sectional view.

Figure 4:
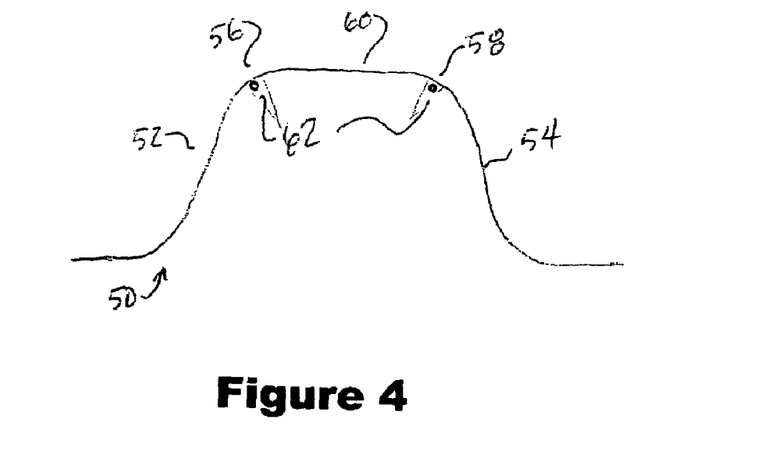
FIG. 4 shows a cross-sectional view of the intensity map surface of a typical character stroke.
Figure 5:
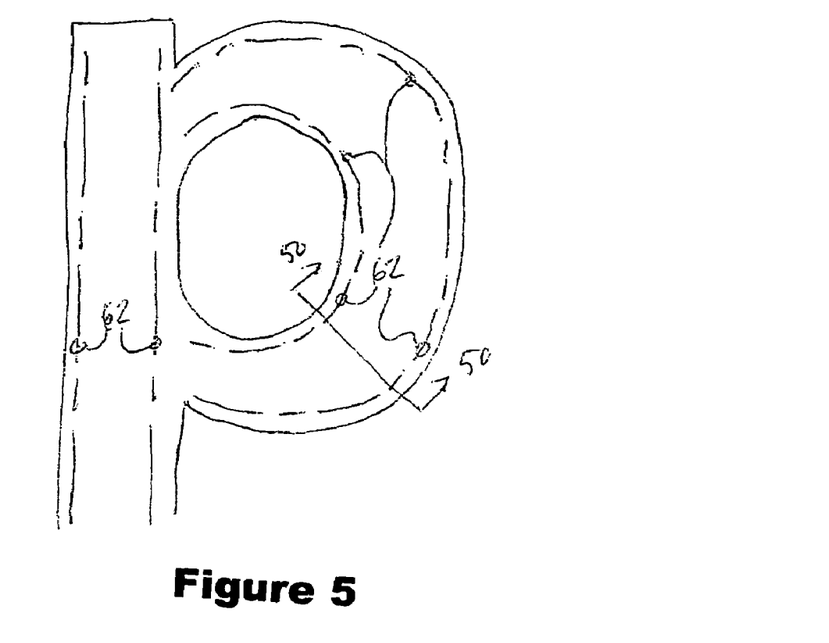
FIG. 5 shows a plan view of a character from FIG. 4 with multiple ridge axes.
Figure 6:
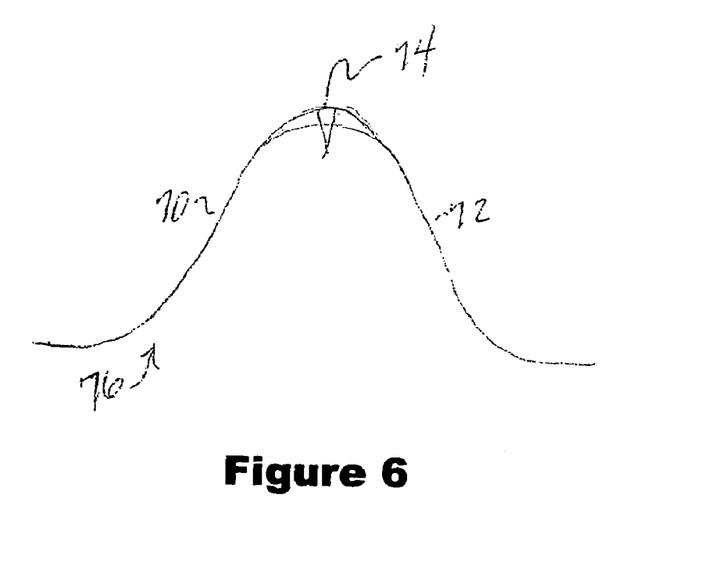
FIG. 6 shows a cross-sectional view of the intensity map surface of a character stroke after substantial smoothing has been performed.
Figure 7:
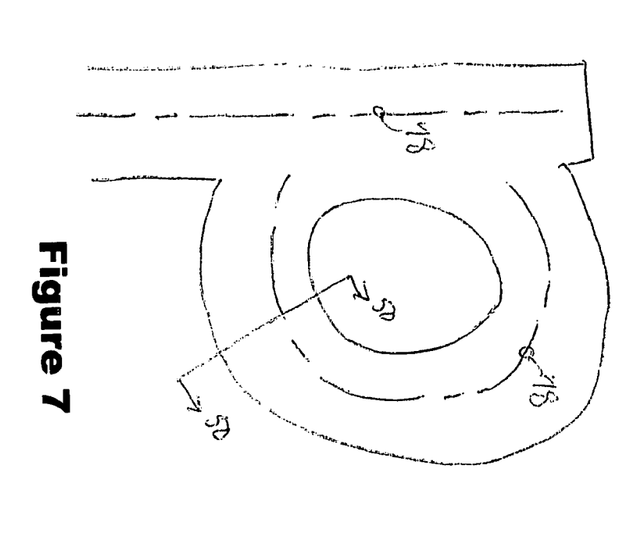
FIG. 7 shows a plan view of a character from FIG. 6 with a single axis.
Figure 8:
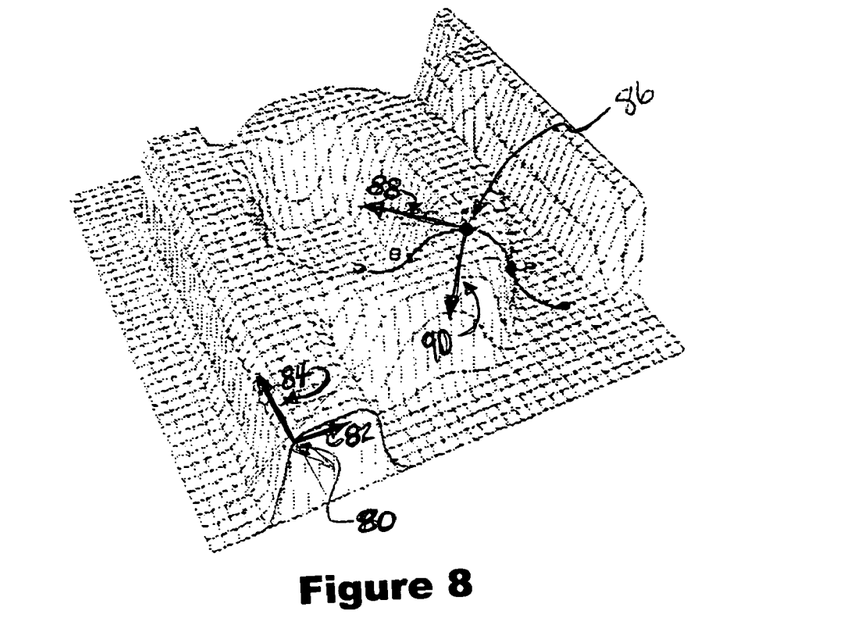
FIG. 8 depicts an image intensity map of the characters shown in FIG. 2A showing the substantially perpendicular axes of minimum and maximum curvature.

In reference to FIG. 4, a transverse cross-section of a character stroke 50, identified by reference lines 50 in FIG. 3, shows a rising edge 52 where the image transitions from dark background to light character and a descending edge 54 where the character transitions back to a dark background. As the rising edge 52 transitions to the plateau 60 of the high-intensity stroke of the character, the cross-sectional surface forms a point of maximum curvature 56 which can be detected through the methods of embodiments of the present invention. Likewise, as the plateau 60 transitions into the descending edge 54 another point of maximum curvature 58 may be formed. The summation of these points of maximum curvature 56, 58 define longitudinal stroke axes 62 as shown in cross-section in FIG. 4 and in plan view in FIG. 5.

In some embodiments of the present invention, the raw intensity data may be processed by smoothing techniques, which may transform the cross-sectional shape of the character stroke. In reference to FIG. 6, the transverse cross-section as delineated in FIG. 3 at 50 may take the form of surface cross-section 76 when the raw intensity data has been smoothed. Section 76 has a rising slope 70 and a descending slope 72. The rounded or smoothed transition between these two slopes 70, 72 has a point of maximum curvature 74 which forms a ridge between the two slopes 70, 72. The summation of these points of maximum curvature, for a smoothed character, may form a single ridge along a longitudinal axis 78 of the character stroke. In many cases, the axis 78 will be somewhat centralized in the character stroke. However, multiple axes and off-center axes may be accommodated in many embodiments of the present invention.

Points of maximum curvature 56, 58, 74 may be found using differential geometry operations on the surface of the intensity map. Neighborhood-oriented mask operations may be used to effectuate these calculations. In preferred embodiments, a pixel is analyzed, using methods of differential geometry, to determine the curvature of the intensity map in each direction around the pixel. A simple 3×3 mask is preferred for its decreased processing time, however, larger masks yield more stable results and may be used when time constraints are relaxed or processing power is increased. When the curvatures around the subject pixel have been calculated, a maximum curvature and a minimum curvature may be determined. These curvatures may be coupled with directional information to establish a maximum curvature direction and a minimum curvature direction. Points of maximum curvature 56, 58, 74 may be identified when the maximum curvature of a pixel meets specific criteria while the minimum curvature of a pixel meets other specific criteria.

Due to the geometric nature of character strokes, ridge and valley points, also called axis points, along these strokes will typically have a maximum curvature within a specific range while the minimum curvature is near zero. Therefore, these axis points may be identified as points which have a maximum curvature greater than a given threshold value while the minimum curvature is near zero or below some minimum curvature threshold value.

The axes of text strokes correspond to topographic features of the image surface—specifically valleys and ridges. These features are distinguished by their principal curvatures ($\kappa_1$, $\kappa_2$), which are measured at each pixel location of the image surface. In particular, for valleys and ridges, the largest of these curvatures is significant, $|\kappa_{max}| \geq \theta$, and the smallest is relatively small—in fact, it is close to 0, $|\kappa_{min}| \leq \epsilon$. Valleys are further distinguished from ridges by the sign of the largest curvature, which is positive for valleys, $\kappa_{max} > 0$, and negative for ridges, $\kappa_{max} < 0$.

It is well know from differential geometry that at each point of a functional surface such as an image the principal curvatures are approximately equal to and proportional to the eigenvalues of the Hessian matrix—i.e., ($\kappa_1$, $\kappa_2$)=($\lambda_1$, $\lambda_2$). Thus, in order to efficiently compute the principal curvatures of an image surface, it is sufficient to solve for these eigenvalues ($\lambda_1$, $\lambda_2$) of the Hessian at each pixel location, where the Hessian is defined in terms of the local $2^{nd}$-derivatives as follows:

$$H = \begin{bmatrix} d_{xx} & d_{xy} \\ d_{xy} & d_{yy} \end{bmatrix}.$$

Techniques for solving such a 2×2, symmetric eigensystem are well documented in the linear-algebra literature, and we will not discuss its solution herein. Anyone skilled in the arts can solve such a system.

With respect to computing the individual entries of the Hessian, it can be shown, in terms of a least-squares approximation, that the preferred 3×3 $2^{nd}$-derivative operators are defined as follows:

$$d_{xx} = \frac{1}{3}\begin{bmatrix} 1 & -2 & 1 \\ 1 & -2 & 1 \\ 1 & -2 & 1 \end{bmatrix}, d_{xy} = \frac{1}{4}\begin{bmatrix} 1 & 0 & -1 \\ 0 & 0 & 0 \\ -1 & 0 & 1 \end{bmatrix}, d_{yy} = \frac{1}{3}\begin{bmatrix} 1 & 1 & 1 \\ -2 & -2 & -2 \\ 1 & 1 & 1 \end{bmatrix}$$

Convolving the smoothed image with each of these, produces a Hessian system at each pixel location. Once the eigenvalues at a pixel location are computed, one can determine whether or not that point corresponds to an axis feature (a valley or a ridge) by applying the following predicate.

```
λ_max = (|λ_1|≧|λ_2|)? λ_1 : λ_2;
λ_min = (|λ_1|≧|λ_2|)? λ_2 : λ_1;
Significant = (|λ_max|≧θ)? TRUE : FALSE;
Small = (|λ_min|≦ε)? TRUE : FALSE;
if(Significant && Small) {
    if(λ_max >0)
        featureType = VALLEY;
    else if(λ_max <0)
        featureType = RIDGE;
}
```

The above methods have successfully detected text using values for $\theta$ of around 15 and values for $\epsilon$ of around 1.5, however other values can be used successfully as text size, font and other attributes vary.

The geometric nature of character strokes also dictates that these maximum and minimum curvatures will generally have directions that are roughly perpendicular to each other. This occurs as the maximum curvature slopes in a transverse direction across the cross-section of the stroke while the minimum curvature follows the relatively flat contour of the longitudinal length of the stroke. In reference to FIG. 8, a point of maximum curvature 80 is shown with a maximum curvature in a transverse direction 82 while the minimum curvature falls in a perpendicular longitudinal direction 84 along the character stroke. Another point of maximum curvature 86 lies along a curvilinear axis, but continues to have a maximum curvature in a transverse direction 88 while the minimum curvature lies in a roughly perpendicular direction 90. Consequently, pixels which meet this condition may be identified as partial axes of character strokes or pixels to be evaluated for further text relationships based on geometric relationships or other criteria.

Once character edges and stroke axes have been identified, the methods and systems of embodiments of the present invention analyze the edge and axis data to determine whether relationships between these data support a likelihood that text is present in the image. Some embodiments of the present invention analyze the proximity of edge features to axis features. Other embodiments may also utilize the geometric relationships of edge features to axis features. Preferred embodiments analyze the relationships between edge and axis features using a geometrically-directed analysis. These methods generally begin with an edge pixel for which intensity gradient information has been obtained and examine adjacent pixels in the intensity gradient direction or an opposite direction depending on whether the background is darker than the text. If the text is lighter, a ridge axis will be found in the direction of the intensity gradient and if the text is darker, a valley axis will be found in a direction opposite to the intensity gradient direction. Both directions may be analyzed when text/background intensity is not known as in a general purpose scanner or copier application.

These preferred embodiments may determine relationships by beginning at a subject pixel that has been identified as an edge pixel and progressively analyzing adjacent pixels in a direction parallel with the intensity gradient of the subject pixel. Pixels may be analyzed to determine whether they have been identified as edge or axis pixels. In this manner, the distance and geometric relationship between edges and axes may be established without the unidirectional constraints of scan-line methods. By following the intensity gradient 44, as shown in FIG. 3, the analysis path typically runs transverse to the character stroke rather than horizontal or vertical to the image. This transverse directional approach will generally locate an adjacent axis or edge along the shortest distance to that feature.

The transverse directional methods of embodiments of the present invention eliminate false-negative text search results which result from vertical scan-lines through vertical text strokes such as at line 46 in FIG. 3 or horizontal scan-lines through approximately horizontal strokes such as at line 48 in FIG. 3. These known scan-line methods fail to detect as text the wide contrasting areas at these locations despite their location on text characters whereas the transverse-stroke methods of embodiments of the present invention consistently measure across the stroke thereby detecting the true proximity of the character stroke edges.

Once the geometric relationships between character edges and axes has been established, methods of embodiments of the present invention may be used to identify text for selective processing. Text may be identified by the presence of one or more axes in close proximity to an edge or to each other. Text may also be identified by a geometric relationship between axes and edges, between adjacent axes, between adjacent edges or between axes, edges and other character structures. Using these methods, text may be detected by the presence of strokes and their associated edges and axes rather than complete characters or groups of characters thereby reducing detection time and resources. These methods may also yield fewer false-negative results because a character may be resolved over a smaller spatial extent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for detecting text in a mixed-content image comprising:
   processing said image to identify edge pixels associated with significant intensity changes;
   processing said image to identify an intensity gradient direction for each of said edge pixels;
   processing said image to identify one of a ridge or a valley pixel having coincident curvature wherein a maximum curvature of an intensity map, centered on a subject pixel occurs at the same location as a minimum curvature of said intensity map;
   when said coincident curvature position exists, identifying said subject pixel as one of a ridge or a valley pixel;
   measuring the proximity of said one of a ridge or a valley pixel to said edge pixel; and
   identifying said edge pixel as a text edge pixel when said proximity conforms to specified proximity criteria.

2. A method for detecting text in a mixed-content image, said method comprising:
   identifying an edge associated with a high-contrast intensity change;
   identifying an intensity gradient direction for said edge;
   identifying a character stroke axis, wherein said axis is an element in the group consisting of a stroke valley or a stroke ridge;
   wherein said identifying comprises an analysis of image components until the change in curvature of the intensity curve between two successive image components in a direction substantially parallel to the intensity gradient direction reaches a maximum absolute value at the same position that the change in curvature of the intensity curve in a direction substantially perpendicular to the intensity gradient direction is near zero;
   wherein said curvature of the intensity curve is calculated by solving for the eigenvalues of a Hessian matrix;
   measuring a distance, in the intensity gradient direction, between said axis and said edge; and
   identifying said edge as a text edge when said distance is less than a threshold value.

3. A method for detecting text in a mixed-content image, said method comprising:
   identifying an edge associated with a high-contrast intensity change;
   identifying an intensity gradient direction for said change;
   identifying a character stroke axis, wherein said axis is selected from the group consisting of a stroke valley and a stroke ridge, comprising the acts of: (1) analyzing successive pixels to identify a coincident curvature position wherein a substantial curvature of an intensity map occurs at the same location as a minimal curvature of said intensity map; and (2) measuring a substantially transverse distance between said axis and said edge; and
   identifying said edge as a text edge when said substantially transverse distance is less than a threshold value.

4. A method for detecting text in a mixed-content image comprising:
   processing said image to identify edge components associated with significant intensity changes;
   processing said image to identify an intensity gradient direction for each of said edge components;
   processing said image to identify character stroke axes, wherein said stroke axes are one of a stroke valley or a stroke ridge, comprising the step of analyzing successive pixels to identify a coincident curvature position wherein a maximum curvature of an intensity map, said maximum curvature being greater than a threshold value, occurs at the same location as a minimal curvature of said intensity map, said minimal curves being lower than a specified value;
   measuring the proximity of said axes to said edge component; and
   identifying said edge component as a text edge component when said proximity conforms to specified proximity criteria.

5. A computer readable medium for detecting text in a mixed-content image, said method comprising the acts of:

identifying an image edge component of an edge associated with a high-contrast intensity change in an image;

identifying an intensity gradient direction for said edge component;

identifying a geometric intensity curvature feature consisting of a ridge or a valley, where said identifying a geometric intensity curvature comprises an analysis of image components until the change in curvature of the intensity curve between two successive image components in a direction substantially parallel to the intensity gradient direction reaches a maximum absolute value at the same position that the change in curvature of the intensity curve in a direction substantially perpendicular to the intensity gradient direction is near zero;

measuring the proximity of said feature to said edge; and identifying said edge component as a text edge component when said proximity conforms to specific proximity criteria.

6. A method for detecting text in a mixed-content image, said method comprising:

identifying an edge associated with a high-contrast intensity change;

identifying an intensity gradient direction for said edge;

identifying a character stroke axis, wherein said axis is selected from the group consisting of a stroke valley or a stroke ridge;

measuring a substantially transverse distance between said axis and said edge;

identifying said edge as a text edge when said substantially transverse distance is less than a threshold value; and analyzing successive pixels to identify a coincident curvature position wherein a substantial curvature of an intensity map occurs at the same location as a minimal curvature of said intensity map in another direction.

7. A method for detecting text in a mixed-content image comprising:

processing said image to identify edge components associated with significant intensity changes;

processing said image to identify an intensity gradient direction for each of said edge components;

processing said image to identify character stroke axes, wherein said axes are one of a stroke valley or a stroke ridge;

measuring the proximity of said axes to said edge component;

identifying said edge component as a text edge component when said proximity conforms to specified proximity criteria; and analyzing successive pixels to identify a coincident curvature position wherein a maximum curvature of an intensity map, said maximum curvature being greater than a threshold value, occurs at the same location as a minimal curvature of said intensity map, said minimal curvature being lower than a specified value and being in a direction approximately perpendicular to said maximum curvature.

* * * * *